United States Patent [19]

Fuller

[11] Patent Number: 5,505,578
[45] Date of Patent: Apr. 9, 1996

[54] TRANSPORTABLE HOIST FOR LIFTING LARGE VEHICLE WHEELS

[76] Inventor: Keith L. Fuller, AO #34164 MSP, 700 Conley Lake Rd., Deerlodge, Mont. 59722

[21] Appl. No.: 446,951

[22] Filed: May 15, 1995

[51] Int. Cl.$^6$ ............................................. B60B 31/06
[52] U.S. Cl. ..................... 414/427; 254/2 R; 269/17; 269/8
[58] Field of Search .................. 414/589, 426, 414/563, 427, 428, 627, 429, 430; 280/402; 254/2 R; 269/17, 8

[56] References Cited

U.S. PATENT DOCUMENTS

| | | | |
|---|---|---|---|
| 1,374,986 | 4/1921 | Carter | 414/426 |
| 2,392,409 | 1/1946 | Ray | 414/429 |
| 2,516,260 | 7/1950 | Schildmeier | 414/427 |
| 2,525,437 | 10/1950 | Winzler et al. | 414/427 |
| 2,792,139 | 5/1957 | Lloyd | 414/428 |
| 3,850,321 | 11/1974 | Virnig | 414/427 |
| 3,951,287 | 4/1976 | Cofer | 414/427 |
| 4,123,038 | 10/1978 | Meyers | 414/427 X |
| 4,771,531 | 9/1988 | Asher | 414/427 X |
| 5,013,209 | 5/1991 | DeMichele et al. | 414/426 X |
| 5,362,194 | 11/1994 | Kassebaum | 414/427 |

FOREIGN PATENT DOCUMENTS

| | | | |
|---|---|---|---|
| 137056 | 6/1988 | Japan | 414/427 |
| 264922 | 3/1970 | U.S.S.R. | 414/427 |

*Primary Examiner*—Frank E. Werner

[57] ABSTRACT

A transportable hoist for lifting large vehicle wheels comprising: a frame including a front section and two side sections, the front section having two free ends including castors, each side section having a front end affixed to the front section, each side section having a rear end including a castor; a hydraulic cylinder jack being positioned centrally upon the front section of the frame, the jack including a piston rod extending within and upwardly therefrom, the jack including a handle to effect upward or downward movement of the piston rod; and a suspension bar being affixed to the uppermost extent of the piston rod and extending rearwardly therefrom, the bar having a rearward extent including a tire coupling device suspended by a chain, an extension tube projecting downwardly and rearwardly from the bar, the tube having a first end fixedly connected to the bar and a second end formed as a tire rest platform adapted to permit placement of a large vehicle tire thereupon.

2 Claims, 4 Drawing Sheets

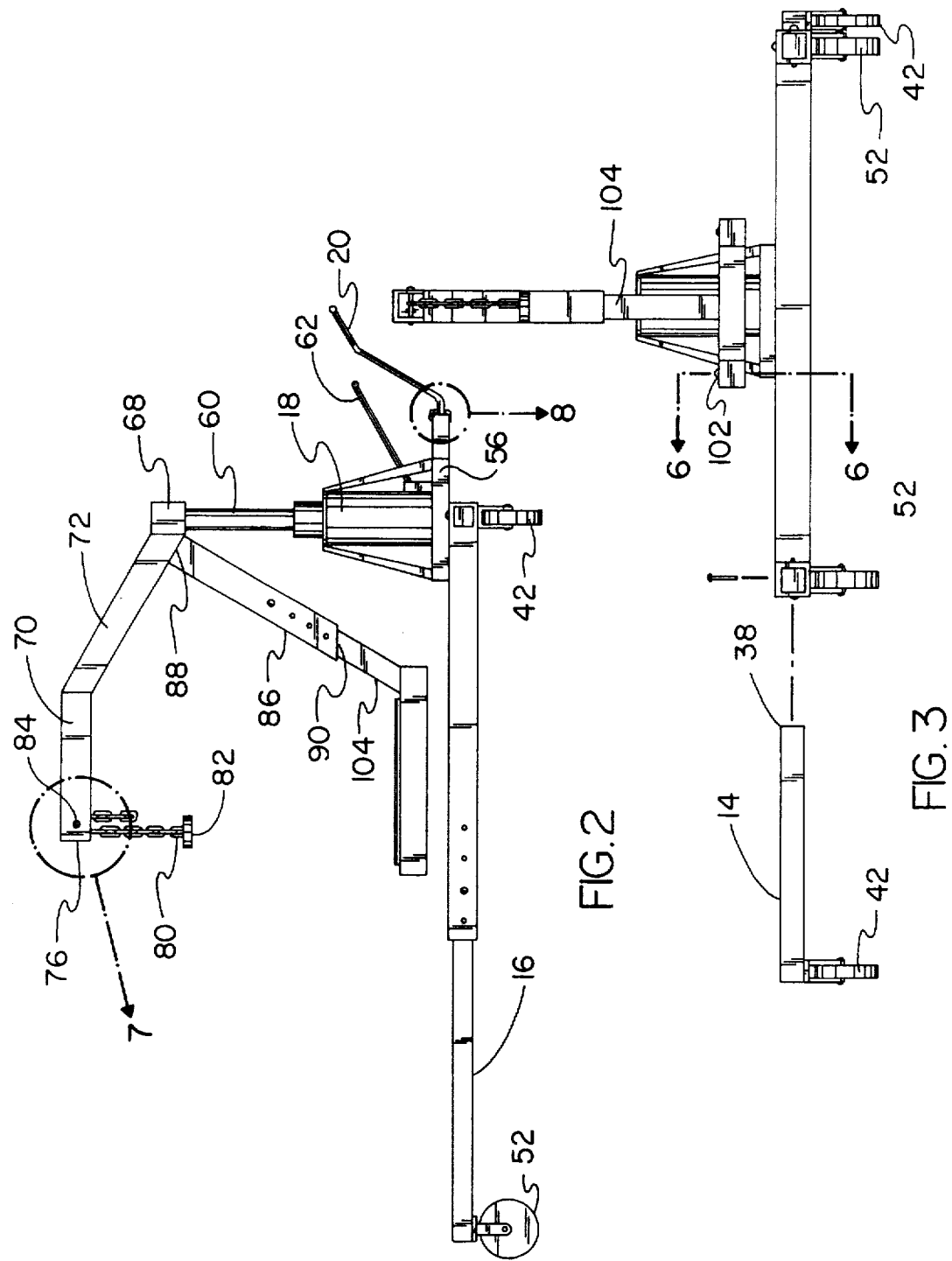

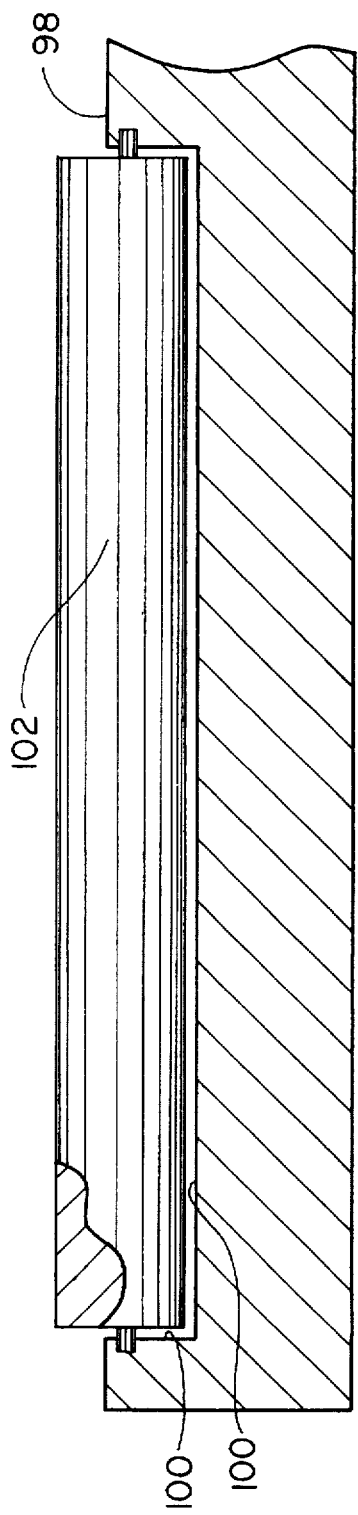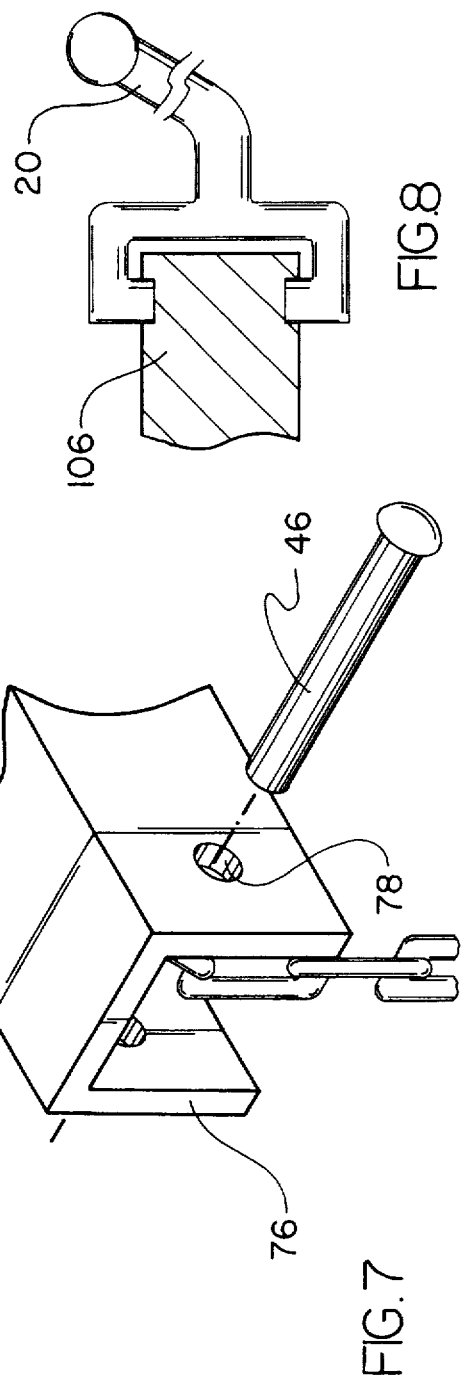

5,505,578

TRANSPORTABLE HOIST FOR LIFTING LARGE VEHICLE WHEELS

BACKGROUND OF THE INVENTION

1. Field of the Invention

The present invention relates to a transportable hoist for lifting large vehicle wheels and more particularly pertains to lifting and maneuvering large vehicle wheels by coupling them to the apparatus and activating the hoist.

2. Description of the Prior Art

The use of vehicle related lifting devices is known in the prior art. More specifically, vehicle related lifting devices heretofore devised and utilized for the purpose of lifting vehicles and related components thereof are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,771,531 to Asher a device for lifting vehicle wheels.

U.S. Pat. No. 4,571,142 to Niewald discloses a mechanism for lifting vehicle tires.

U.S. Pat. No. 4,097,022 to Taylor discloses a wheel jack apparatus.

U.S. Pat. No. 4,022,341 to Lindquist discloses lifting device for tire-rim assemblies.

Lastly, U.S. Pat. No. 5,161,931 to Mayer discloses a wheel handling apparatus.

In this respect, the transportable hoist for lifting large vehicle wheels according to the present invention substantially departs from the conventional concepts and designs of the prior art, and in doing so provides an apparatus primarily developed for the purpose of lifting and maneuvering large vehicle wheels by coupling them to the apparatus and activating the hoist.

Therefore, it can be appreciated that there exists a continuing need for a new and improved transportable hoist for lifting large vehicle wheels which can be used for lifting and maneuvering large vehicle wheels by coupling them to the apparatus and activating the hoist. In this regard, the present invention substantially fulfills this need.

SUMMARY OF THE INVENTION

In view of the foregoing disadvantages inherent in the known types of vehicle related lifting devices now present in the prior art, the present invention provides an improved transportable hoist for lifting large vehicle wheels. As such, the general purpose of the present invention, which will be described subsequently in greater detail, is to provide a new and improved transportable hoist for lifting large vehicle wheels and method which has all the advantages of the prior art and none of the disadvantages.

To attain this, the present invention essentially comprises a new and improved transportable hoist for lifting large vehicle wheels comprising, in combination: a frame fabricated of hollow rectangular steel tubing and including a front section having two open ends and two side- sections having one open end, each open end of the front section including a plurality of apertures, each side section having an end formed contiguously with each end of the front section, the open end of each side section including a plurality of apertures, the side sections being positioned perpendicular to the front section; two front section insert shafts and two side section insert shafts, each shaft being formed of rectangular steel tubing having a smaller thickness than the frame, each front section insert shaft having a first end including a plurality of apertures and a second end including a rotatable castor, the first end of each front section insert shaft adapted to be positioned longitudinally through an open end of the front section, coupling pins being positioned through the aligned apertures, each side section insert shaft having a first end including a plurality of apertures and a second end including a unidirectional castor, the first end of each side section insert shaft adapted to be positioned longitudinally through the open end of each side section, coupling pins being positioned through the aligned apertures; a base formed in a planar rectangular configuration and positioned centrally upon the front section of the frame, a hydraulic cylinder jack being formed in a cylindrical configuration and positioned centrally upon the base, the base including a plurality of upwardly extending braces being coupled to the jack, the jack including an operatively coupled cylindrical piston rod extending within and upwardly therefrom, the jack including an operatively coupled elongated handle, the handle adapted to be pushed downward by a user to effect upward or downward movement of the piston rod; a suspension bar formed of generally rectangular shaped steel tubing, the bar having a block portion, a horizontal portion and an upwardly angled portion therebetween, the block portion being affixed to the uppermost extent of the piston rod, the upwardly angled portion being fixedly connected to the block portion and extending upwardly and rearwardly therefrom, the horizontal portion being fixedly connected to the upwardly angled portion and extending rearwardly and horizontally therefrom, the horizontal portion having a rearward extent including an aperture, a chain having a first end affixed to a large magnet, a coupling pin being positioned through the chain and the aperture in the horizontal portion thereby suspending the magnet; an extension tube formed of hollow rectangular shaped steel tubing, the tube having a first end fixedly connected to the suspension bar adjacent to the block and a second end including a plurality of apertures, a tire rest platform having a front segment with two side segments extending perpendicularly therefrom, each side segment having an upper surface including a semi cylindrical shaped bore, a roller formed in a generally cylindrical configuration being rotatably coupled within each bore, an insert bar formed in a generally rectangular configuration extending upwardly from the approximate center point of the front segment, the insert bar having a free end including apertures and adapted to be coupled within the extension tube with a coupling pin; and a pull bar support formed in a generally rectangular configuration with two rounded recessed slots, the support being fixedly connected to the base, an elongated push/pull bar having a first end including a ball and a second end including two rounded insert members, the push/pull bar adapted to be rotationally coupled within the support to permit the user to push or pull the apparatus at a plurality of angles.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved transportable hoist for lifting large vehicle wheels which has all of the advantages of the prior art vehicle related lifting devices and none of the disadvantages.

It is another object of the present invention to provide a new and improved transportable hoist for lifting large vehicle wheels which may be easily and efficiently manufactured and marketed.

It is further object of the present invention to provide a new and improved transportable hoist for lifting large vehicle wheels which is of durable and reliable constructions.

An even further object of the present invention is to provide a new and improved transportable hoist for lifting large vehicle wheels which is susceptible of a low cost of manufacture with regard to both materials and labor, and which accordingly is then susceptible of low prices of sale to the consuming public, thereby making such transportable hoist for lifting large vehicle wheels economically available to the buying public.

Still yet another object of the present invention is to provide a new and improved transportable hoist for lifting large vehicle wheels which provides in the apparatuses and methods of the prior art some of the advantages thereof, while simultaneously overcoming some of the disadvantages normally associated therewith.

Still another object of the present invention is to lift and maneuver large vehicle wheels by coupling them to the apparatus and activating the hoist.

Lastly, it is an object of the present invention to provide a new and improved transportable hoist for lifting large vehicle wheels comprising: a frame including a front section and two side sections, the front section having two free ends including castors, each side section having a front end affixed to the front section, each side section having a rear end including a castor; a hydraulic cylinder jack being positioned centrally upon the front section of the frame, the jack including a piston rod extending within and upwardly therefrom, the jack including a handle to effect upward or downward movement of the piston rod; and a suspension bar being affixed to the uppermost extent of the piston rod and extending rearwardly therefrom, the bar having a rearward extent including a tire coupling device suspended by a chain, an extension tube projecting downwardly and rearwardly from the bar, the tube having a first end fixedly connected to the bar and a second end formed as a tire rest platform adapted to permit placement of a large vehicle tire thereupon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the apparatus shown in FIG. 1.

FIG. 3 is a separated rear elevational view of the apparatus illustrating the positioning of a front insert shaft.

FIG. 6 is a cross sectional view of a tire rest platform roller taken along line 6—6 of FIG. 3.

FIG. 7 is a cross sectional view of the horizontal portion of the suspension bar illustrating the positioning of the chain and associated coupling pin.

FIG. 8 is an enlarged perspective view taken at circle 8 of FIG. 2 and illustrating the coupling of the push/pull bar to the bar support.

The same reference numerals refer to the same parts through the various Figures.

DESCRIPTION OF THE PREFERRED EMBODIMENT

Figure 1:
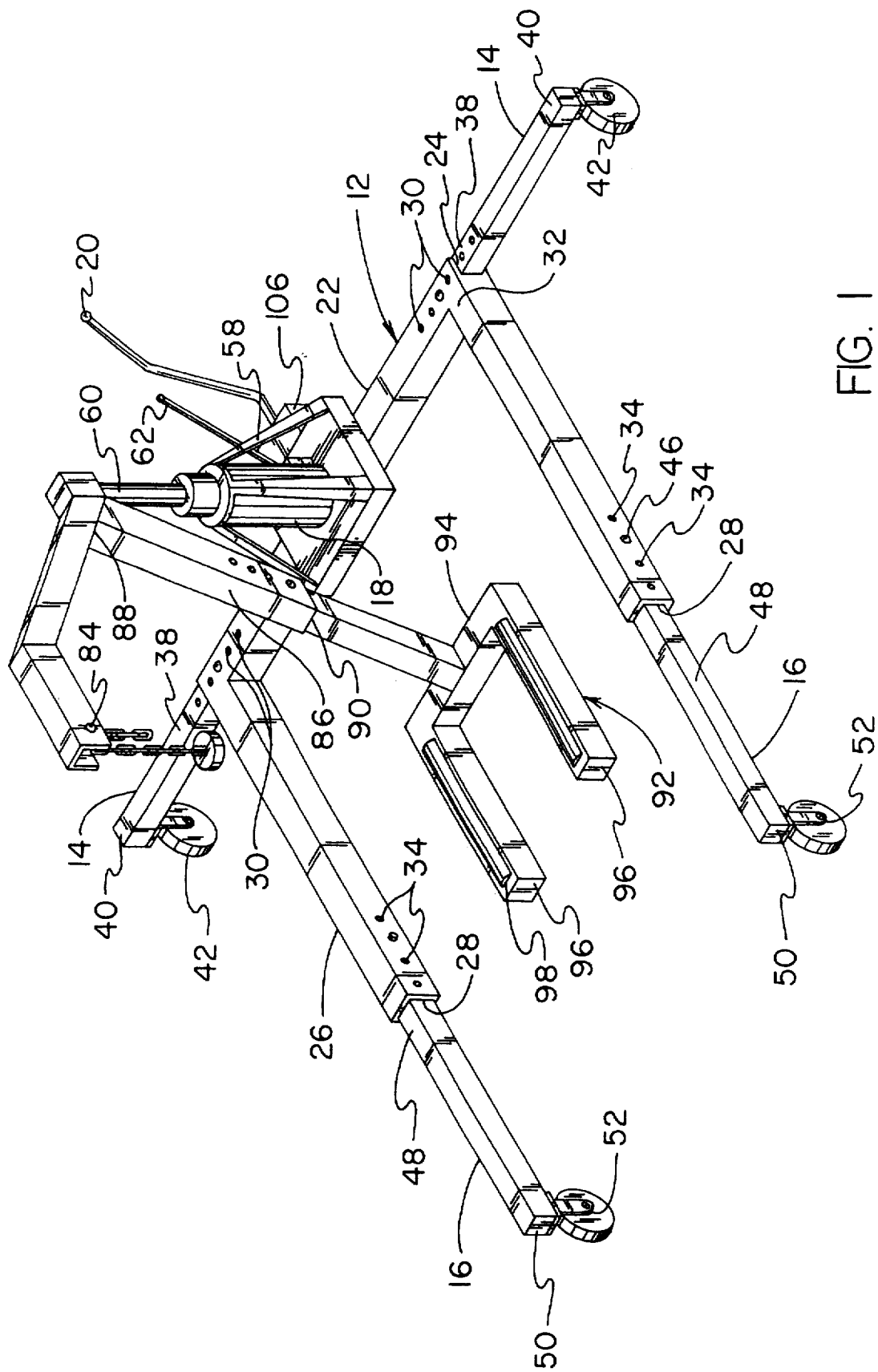
FIG. 1 is a perspective view of the preferred embodiment of the transportable hoist for lifting large vehicle wheels constructed in accordance with the principles of the present invention.

With reference now to the drawings, and in particular to FIG. 1 thereof, the preferred embodiment of the new and improved transportable hoist for lifting large vehicle wheels embodying the principles and concepts of the present invention and generally designated by the reference numeral 10 will be described.

The present invention, the transportable hoist for lifting large vehicle wheels 10 is comprised of a plurality of components. Such components in their broadest context include a frame 12, front section insert shafts 14, side section insert shafts 16, a hydraulic jack 18 and a push/pull bar 20. Such components are individually configured and correlated with respect to each other so as to attain the desired objective.

Figure 4:
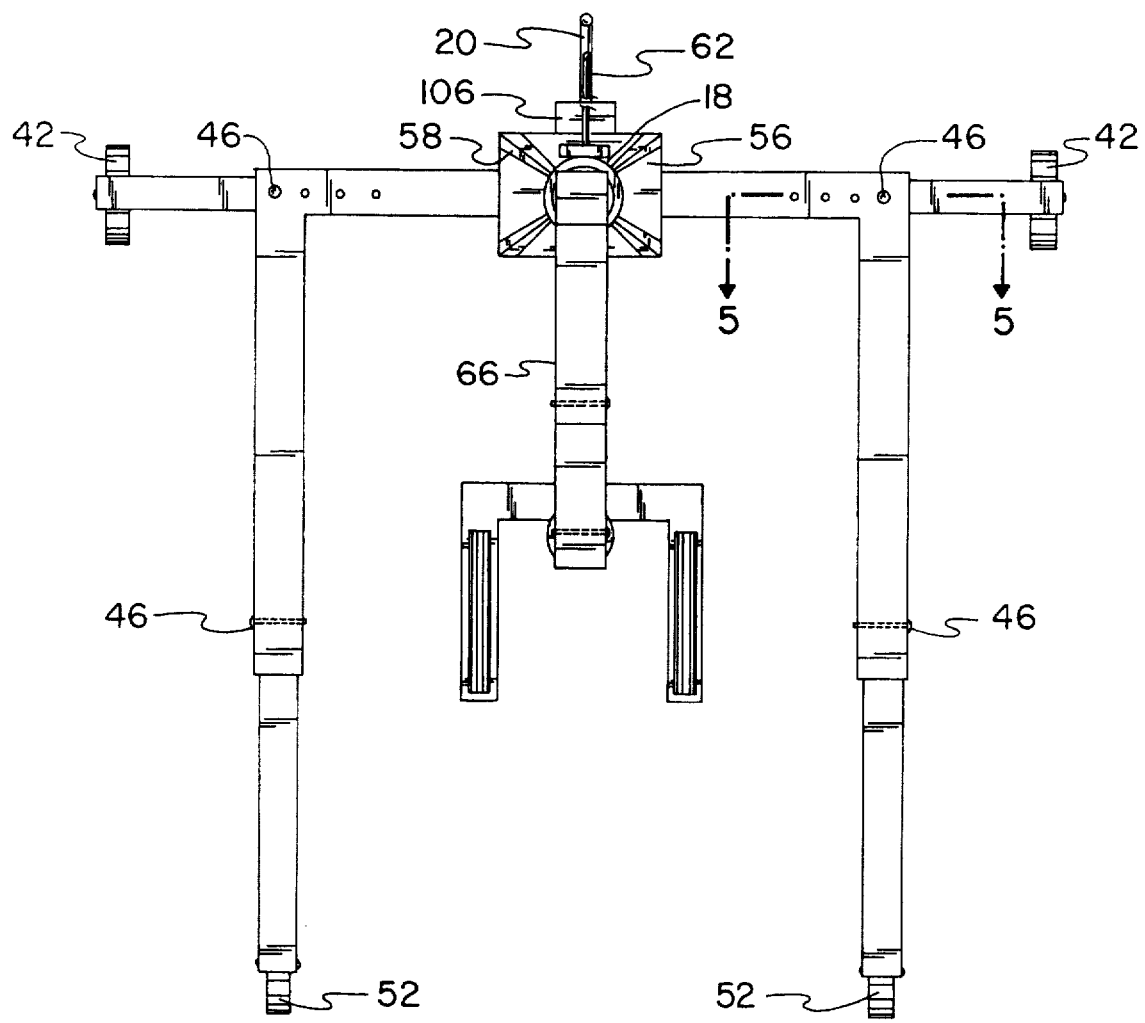
FIG. 4 is a top plan view of the apparatus shown in FIG. 1.

More specifically, the frame 12 is fabricated of hollow rectangular steel tubing and includes a front section 22 having two open ends 24 and two side sections 26 having one open end 28. In the preferred embodiment all of the components of the apparatus are fabricated of steel. The sturdy steel construction permits lifting and transporting of very heavy vehicle tires. Each open end of the front section includes a plurality of apertures 30. Each side section has an end 32 formed contiguously with each end of the front section. The side sections may be formed contiguously with the front section or welded to it at a later point in the manufacturing process. The open end of each side section includes a plurality of apertures 34. The side sections are positioned perpendicular to the front section. Note FIGS. 1 and 4.

Figure 5:
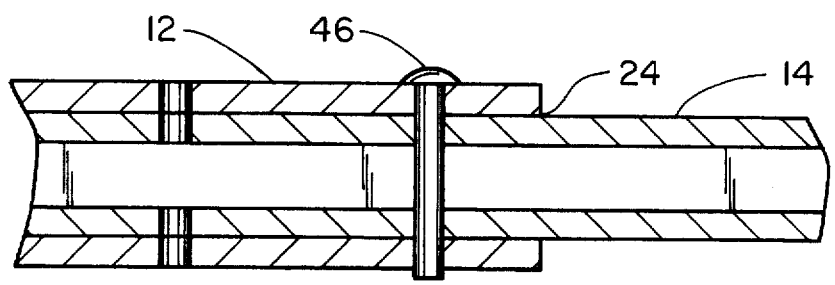
FIG. 5 is a cross sectional view of the frame, a front insert shaft and a coupling pin taken along line 5—5 of FIG. 4.

Two front section insert shafts 14 and two side section insert shafts 16 are include with the apparatus. Each shaft is formed of rectangular steel tubing and has a smaller thickness than the frame. The small thickness permits coupling within the hollow interior of the frame sections. Each front section insert shaft has a first end 38 which includes a plurality of apertures and a second end 40 which includes a rotatable castor 42. The castors of the front section are rotatable up to 360 degrees. In the preferred embodiment the castors are six inches in diameter and designed to support heavy vehicles and machinery. Suitable rubber tires are used on the castors to enhance traction on various surfaces. Note FIGS. 3 and 5.

The first end of each front section insert shaft is adapted to be positioned longitudinally through an open end of the front section. The apertures present in the insert shaft and front section permit users to vary the length that the castors extend from the front section. The length is easily adjusted by aligning selected apertures in the front section with corresponding apertures in the insert shafts. Coupling pins 46 are positioned through the aligned apertures. Each side section insert shaft has a first end 48 which includes a plurality of apertures and a second end 50 which includes a unidirectional castor 52. In the preferred embodiment the unidirectional castor has a six inch diameter and includes suitable tires to support heavy vehicle tires. The unidirectional castor may only be moved in one direction. This configuration along with the rotatable castors of the front section enable a user to easily transport the device from place to place. The first end of each side section insert shaft is adapted to be positioned longitudinally through the open end of each side section. The insert shafts are easily positioned within the hollow interior of the side sections. The length of the side sections is easily adjusted by positioning the apertures in an aligned orientation. Coupling pins 46 are positioned through the aligned apertures. Note FIGS. 4 and 5.

A base 56 is formed in a planar rectangular configuration and positioned centrally upon the front section of the frame. The sturdy base provides a firm resting surface for the hydraulic cylinder. A hydraulic cylinder jack 18 is formed in a cylindrical configuration and positioned centrally upon the base. The central positioning of the hydraulic cylinder jack uniformly distributes the weight of a lifted tire when utilizing the apparatus. The base includes a plurality of upwardly extending braces 58 which are coupled to the jack. The braces provide enhanced stability to the hydraulic cylinder jack. The jack includes an operatively coupled cylindrical piston rod 60 which extends within and upwardly from the jack. The jack includes an operatively coupled elongated handle 62. The handle is adapted to be pushed downward by a user to effect upward or downward movement of the piston rod. In the preferred embodiment the jack includes means for directing movement of the piston rod in an upward or downward direction as desired by the user. The user simply activates the adjustment means and pushes the handle downward to either lower or raise the piston rod in a vertical direction. The cylinder jack is hydraulically powered in the preferred embodiment but may be powered by gas or electrical means in alternative embodiments of the apparatus. Note FIGS. 1 and 2.

A suspension bar 66 is formed of generally rectangular shaped steel tubing. The bar has a block portion 68, a horizontal portion 70 and an upwardly angled portion 72 therebetween. The block portion is formed in a generally cube shaped configuration and affixed to the uppermost extent of the piston rod 60. The upwardly angled portion is fixedly connected to the block portion and extends upwardly and rearwardly from it. The horizontal portion is fixedly connected to the upwardly angled portion and extends rearwardly and horizontally from it. The suspension bar extends centrally between the side sections of the apparatus. The upwardly angled orientation provides clearance for lifting and maneuvering a vehicle tire in the operative orientation. The horizontal portion has a rearward extent 76 which includes an aperture 78. A chain has a first end 80 affixed to a large magnet 82. A coupling pin 84 is positioned through the chain and the aperture in the horizontal portion thereby suspending the magnet above the tire rest platform. The length of the chain may be adjusted by positioning the coupling pins through various links of the chain. Note FIGS. 1 and 2.

An extension tube 86 is formed of hollow rectangular shaped steel tubing. The tube has a first end 88 fixedly connected to the suspension bar adjacent to the block. The tube has a second end 90 which includes a plurality of apertures. A tire rest platform 92 has a front segment 94 with two side segments 96 extending perpendicularly from it. Each side segment has an upper surface 98 which includes a semi cylindrical shaped bore 100. A roller 102 is formed in a generally cylindrical configuration and is rotatably coupled within each bore. In the preferred embodiment the rollers include an elastomeric surface to enhance gripping of vehicle tires. An insert bar 104 is formed in a generally rectangular configuration and extends upwardly from the approximate center point of the front segment of the tire rest platform. The insert bar has a free end which includes a plurality of apertures. The length to which the insert bar projects from the extension tube may be adjusted by positioning the apertures in an aligned orientation. Note FIGS. 2, 3 and 6.

The primary use of the apparatus is to change tires on tractors, trailers, monster trucks, skidsters and some smaller types of construction equipment. The configuration of the apparatus is similar to an engine lift but it will lift more weight in order to accommodate some of the heavier tires on the market. To utilize the apparatus the platform with the hydraulic jack is lowered in a downward direction so that the tire rest platform is flush with the ground. The tire of the large vehicle is then rolled in a vertical orientation upon the rollers of the tire rest platform. The rotatable rollers facilitate this process. The length of the chain bearing the magnet is then adjusted to accommodate the size of a particular vehicle wheel. The magnet is coupled to the rim of a vehicle wheel to hold it in an upright position and enhance the ease of maneuverability of the wheel. Once the tire is coupled in a vertical orientation to the magnet and tire rest platform it is easily lifted by manipulating the hydraulic jack. This apparatus may be utilized in auto shops, the yards of ranchers, at race tracks, and at big truck shows, etc. Note FIG. 1.

A bar support 106 is formed in a generally rectangular configuration with two rounded recessed slots. The support is fixedly connected to the base. An elongated push/pull bar 20 has a first end which includes a ball and a second end which includes two rounded insert members. The push/pull bar is adapted to be rotationally coupled within the support to permit the user to push or pull the apparatus at a plurality of angles. When the user desires to move the apparatus he first lifts the tire rest platform off the ground by manipulating the hydraulic jack. A vehicle tire may or may not be coupled upon the tire rest platform. The user then simply pulls or pushes the pull/push bar in order to effect movement of the apparatus. The unidirectional rear castors and multidirectional rotational castors facilitate movement of the apparatus in a plurality of directions. The mobility of the apparatus greatly enhances it's utility since it can both lift and facilitate transport of heavy tires. Note FIG. 8.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved transportable hoist for lifting large vehicle wheels comprising, in combination:

a frame fabricated of hollow rectangular steel tubing and including a front section having two open ends and two side sections having one open end, each open end of the front section including a plurality of apertures, each side section having an end formed contiguously with each end of the front section, the open end of each side section including a plurality of apertures, the side sections being positioned perpendicular to the front section;

two front section insert shafts and two side section insert shafts, each shaft being formed of rectangular steel tubing having a smaller thickness than the frame, each front section insert shaft having a first end including a plurality of apertures and a second end including a rotatable castor, the first end of each front section insert shaft adapted to be positioned longitudinally through an open end of the front section, coupling pins being positioned through the aligned apertures, each side section insert shaft having a first end including a plurality of apertures and a second end including a unidirectional castor, the first end of each side section insert shaft adapted to be positioned longitudinally through the open end of each side section, coupling pins being positioned through the aligned apertures;

a base formed in a planar rectangular configuration and positioned centrally upon the front section of the frame, a hydraulic cylinder jack being formed in a cylindrical configuration and positioned centrally upon the base, the base including a plurality of upwardly extending braces being coupled to the jack, the jack including an operatively coupled cylindrical piston rod extending within and upwardly therefrom, the jack including an operatively coupled elongated handle, the handle adapted to be pushed downward by a user to effect upward or downward movement of the piston rod;

a suspension bar formed of generally rectangular shaped steel tubing, the bar having a block portion, a horizontal portion and an upwardly angled portion therebetween, the block portion being affixed to the uppermost extent of the piston rod, the upwardly angled portion being fixedly connected to the block portion and extending upwardly and rearwardly therefrom, the horizontal portion being fixedly connected to the upwardly angled portion and extending rearwardly and horizontally therefrom, the horizontal portion having a rearward extent including an aperture, a chain having a first end affixed to a large magnet, a coupling pin being positioned through the chain and the aperture in the horizontal portion thereby suspending the magnet;

an extension tube formed of hollow rectangular shaped steel tubing, the tube having a first end fixedly connected to the suspension bar adjacent to the block and a second end including a plurality of apertures, a tire rest platform having a front segment with two side segments extending perpendicularly therefrom, each side segment having an upper surface including a semi cylindrical shaped bore, a roller formed in a generally cylindrical configuration being rotatably coupled within each bore, an insert bar formed in a generally rectangular configuration extending upwardly from the approximate center point of the front segment, the insert bar having a free end including apertures and adapted to be coupled within the extension tube with a coupling pin; and a pull bar support formed in a generally rectangular configuration with two rounded recessed slots, the support being fixedly connected to the base, an elongated push/pull bar having a first end including a ball and a second end including two rounded insert members, the push/pull bar adapted to be rotationally coupled within the support to permit the user to push or pull the apparatus at a plurality of angles.

2. A transportable hoist for lifting large vehicle wheels comprising:

a frame being fabricated of steel and including a front section and two side sections, the frame being hollow, the front section having two open free ends including coupling devices, each side section having a front end affixed to the front section, each side section having a rear end being open and including coupling devices;

two front section insert shafts and two side section insert shafts, each shaft having a smaller thickness than the frame, each front section insert shaft having a first end including coupling devices and a second end including a castor, the first end of each front section insert adapted to be coupled longitudinally within an open end of the front section, each side section insert shaft having a first end including coupling devices and a second end including a castor, the first end of each side section insert shaft adapted to be coupled longitudinally within the open end of each side section;

a hydraulic cylinder jack being fabricated of steel and positioned centrally upon the front section of the frame, the jack including a piston rod extending within and upwardly therefrom, the jack including a handle to effect upward or downward movement of the piston rod;

a suspension bar being fabricated of steel and affixed to the uppermost extent of the piston rod and extending rearwardly therefrom, the bar having a rearward extent including a large magnet suspended by an adjustable chain, an extension tube projecting downwardly and rearwardly from the bar, the tube having a first end fixedly connected to the bar and a second end formed as a tire rest platform adapted to permit placement of a large vehicle tire thereupon, the tire rest platform including a front segment and two side segments, each side segment having an upper surface including a semi cylindrical shaped bore, a roller formed in a generally cylindrical configuration being rotatably coupled within each bore; and a pull bar support formed in a generally rectangular configuration with two rounded recessed slots, the support being fixedly connected to the front section of the frame, an elongated push/pull bar having a first end including a ball and a second end including two rounded insert members, the push/pull bar adapted to be rotationally coupled within the support to permit the user to push or pull the apparatus at a plurality of angles.

\* \* \* \* \*